United States Patent [19]

Schmidt et al.

[11] 4,037,958
[45] July 26, 1977

[54] APPARATUS FOR DETERMINING PHOTOELECTRICALLY THE POSITION OF AT LEAST ONE FOCUSING PLANE OF AN IMAGE

[75] Inventors: Horst Schmidt, Nauborn; Knut Heitmann; Eckart Schneider, both of Wetzlar, all of Germany; Walter Mandler, Midland, Canada

[73] Assignee: Ernst Leitz Wetzlar GmbH, Wetzlar, Germany

[21] Appl. No.: 622,452

[22] Filed: Oct. 15, 1975

[30] Foreign Application Priority Data

Dec. 21, 1974 Germany .............................. 2460805

[51] Int. Cl.² ........................... G01C 3/08; G01J 1/20
[52] U.S. Cl. ....................................... 356/4; 250/201; 356/156; 356/167; 356/170
[58] Field of Search ................. 356/4, 5, 28, 156, 167, 356/170; 250/201

[56] References Cited

U.S. PATENT DOCUMENTS 3,781,110  12/1973  Leitz et al. ............................. 356/4

FOREIGN PATENT DOCUMENTS 1,249,302  10/1971  United Kingdom .................. 356/28

Primary Examiner—S.C. Buczinski
Attorney, Agent, or Firm—Gilbert L. Wells

[57] ABSTRACT

Apparatus for the photoelectrical determination of the position of at least one focusing plane of an image comprising an imaging optics, at least one spatial frequency filter in the form of a structure or grating mounted in the vicinity of one image plane of said imaging optics, a photoelectric receiver system associated with the filter containing at least one detector and receiving light fluxes leaving this filter, at least one means for generating a relative motion between the structure or grating and the object image, and means for analyzing the output signals from the photoelectric receiver system for distance display and/or focusing of the apparatus. The apparatus is improved by having the imaging optics (10) preceded by wo rhombic prisms (19, 20) so that each pupil half obtains its light through one of the two prisms. A reference beam is provided to show and/or eliminate mechanical changes in the apparatus effecting faultiness of the measuring result.

21 Claims, 8 Drawing Figures

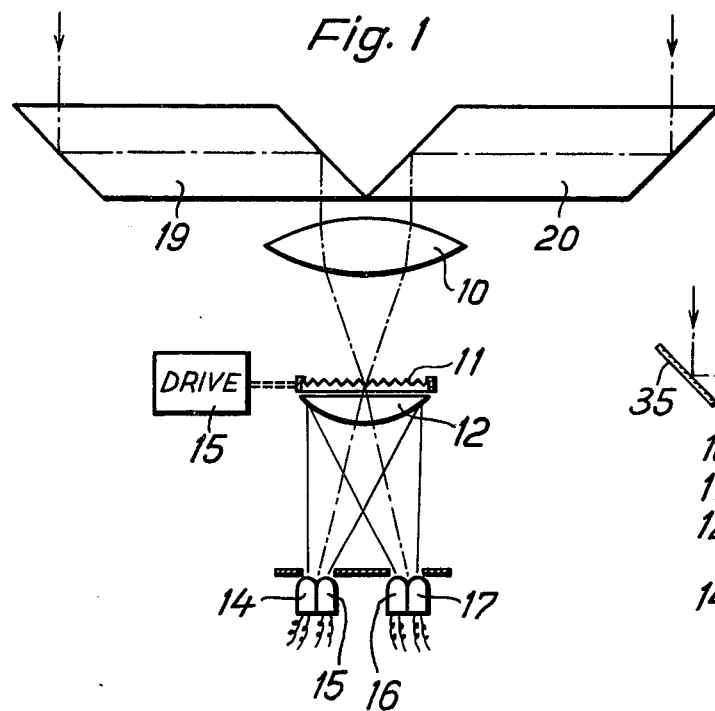
Fig. 1
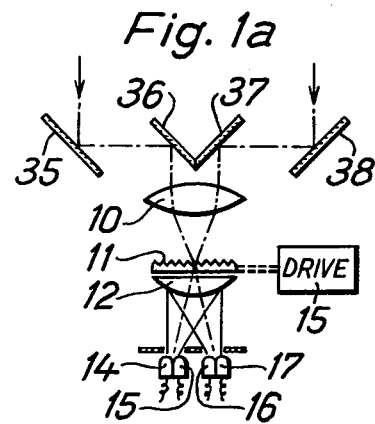
Fig. 1a
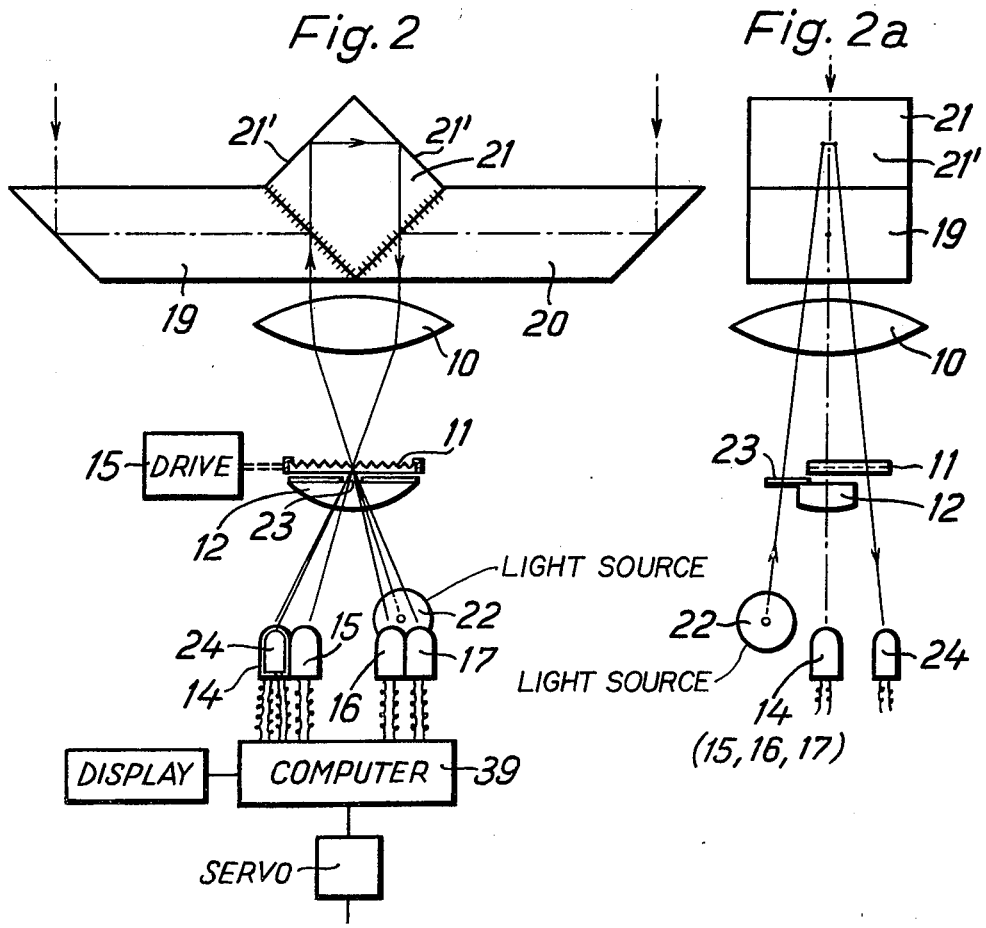
Fig. 2
Fig. 2a

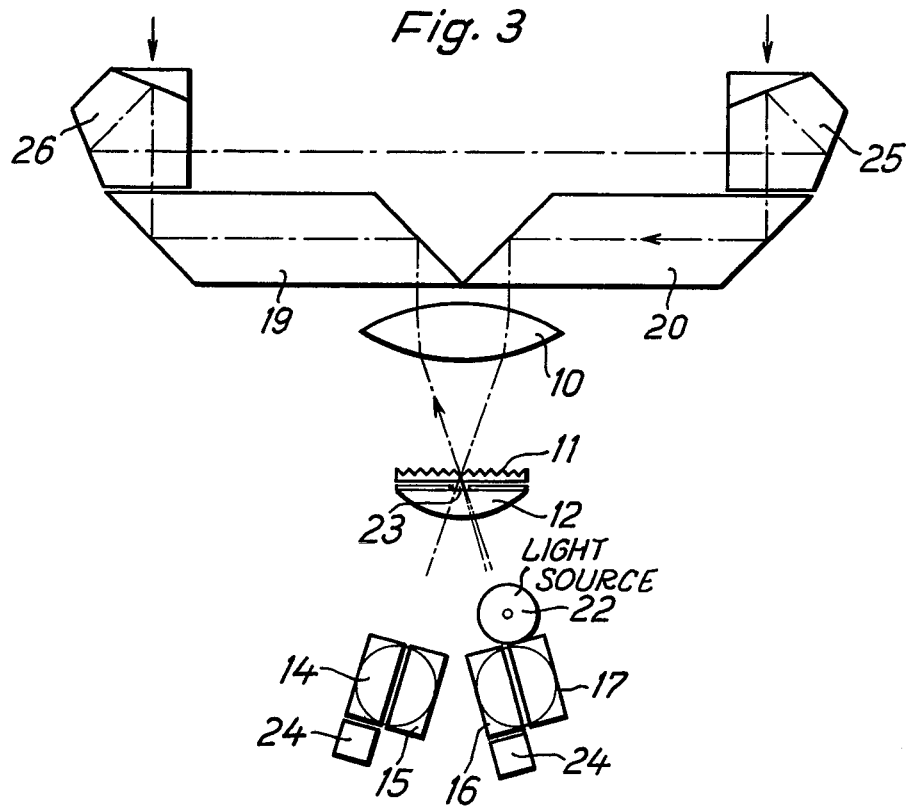
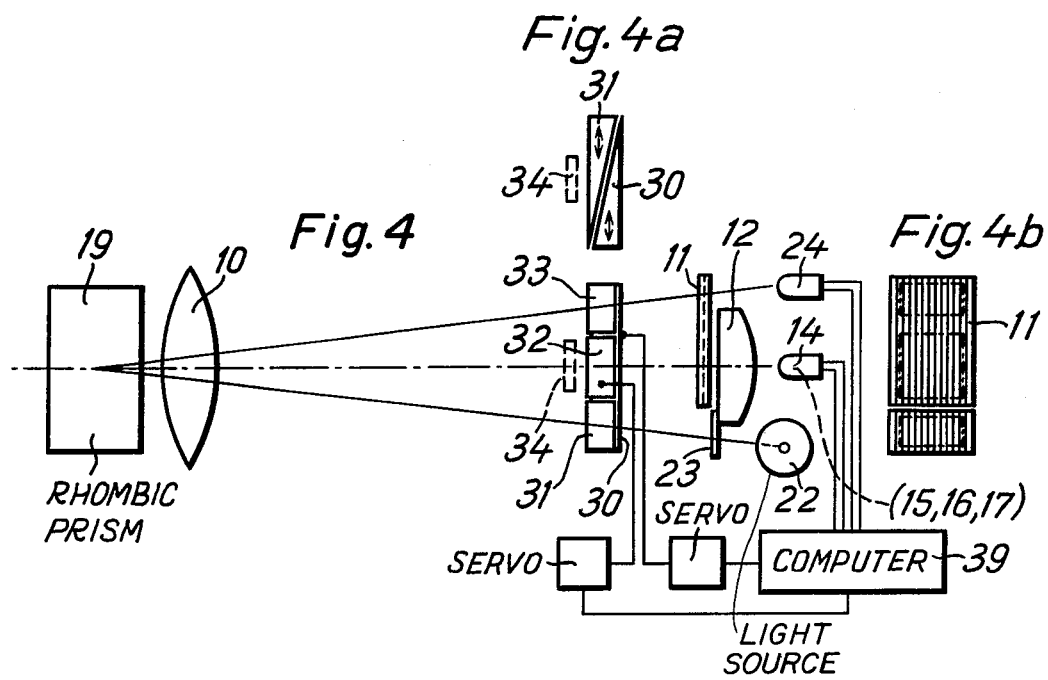

APPARATUS FOR DETERMINING PHOTOELECTRICALLY THE POSITION OF AT LEAST ONE FOCUSING PLANE OF AN IMAGE

CROSS REFERENCE TO RELATED APPLICATIONS

Applicants claim priority under 35 U.S.C. 119 for Application P 24, 60, 805.7, filed Dec. 21, 1974 in the Patent Office of the Federal Republic of Germany.

The disclosure of assignee's copending Application Ser. No. 479,525, filed June 14, 1974, abandoned is incorporated herein, along with U.S. Pat. Nos. 3,856,401 and 3,781,110, and British Pat. No. 1,249,302, to show the state of the art of the apparatus over which the present invention is an improvement.

BACKGROUND OF THE INVENTION

The present invention relates to apparatus for implementing the method for photoelectrically determining the position of at least one focusing plane of an image inside an optical instrument, per U.S. Patent Application Ser. No. 479,525, filed June 14, 1974. In Application Ser. No. 479,525 use is made of an correlator containing imaging optics, at least one spatial frequency filter mounted at least in vicinity of an image plane of said imaging optics and a photoelectric receiver system, and light fluxes are passed through different pupil areas of the imaging optics to be modulated in common by the spatial frequency filter and split for instance geometrically or physically in correspondence with the pupil area, whereupon they are applied in sequence or simultaneously to a common or to separate photoelectric detector(s) of said photoelectric receiver system of which the output signals are processed further to control a display system and/or an adjustment device.

Apparatus to implement the method is described in Application Ser. No. 479,525. The present invention has as an object, creating further devices for implementing the method so as to obtain improved signal quality and to sense any spurious results caused in at least one of the measuring beams by any mechanical changes, and to ascertain the magnitude of such spuriousness or its effect on the measurement data and/or to eliminate such effects on the measurement data.

SUMMARY OF THE INVENTION

The object of the present invention is carried out with apparatus comprising imaging optics, at least one structure or grating acting as a spatial frequency filter and mounted in or in the vicinity of an image plane of said imaging optics, further comprising means for photoelectrically detecting light fluxes leaving the structure or grating associated with the spatial frequency filter. The receiver system receives the light fluxes leaving the filter. The apparatus also includes at least one means to generate a relative motion between the structure or grating and the object image, and furthermore means to analyze the output signals from the photoelectric receiver system for the purpose of a display of distance and/or focusing the apparatus. The apparatus of the present invention is characterized by two rhombic prisms mounted in front of the imaging optics so that each of the pupil halves of said imaging optics gets its light through one of the prisms. These rhombic prisms can be replaced by corresponding mirror systems. For instance, a double wedge is inserted into the beam between the imaging optics and the structure or grating. Additionally a rotatably mounted plano-parallel plate may be placed between said imaging optics and said structure or grating. In addition, the apparatus may be characterized by an arrangement to generate a reference beam indicating mechanical changes effecting at least one of the measuring beams determined by the pupil halves, at least one photoelectric detector being associated with the particular reference beam, of which the output signals corresponding to the change(s) are used for display and/or correction of the changes. The apparatus comprises an illuminating device illuminating an index carrier provided with at least one index which is imaged by the imaging optics, and the reference beam so generated is, in one measuring beam of one pupil half, in a direction opposite to that of incidence of the object radiation. Optical means are provided to transfer the reference beam into the beam of the other pupil half and in the same direction of incidence of the object radiation. The arrangement of the components is such that the reference beam is incident on an index carrier with at least one index associated with at least one photoelectric detector for the generation of signals corresponding to the offset between a reference position and the projected index image.

The mirror systems mounted on the rhombic prisms may be used as the optical means for transferring the reference beam. However, a mirror system may also be inserted between the rhombic prisms. A structure or grating defining a given spatial frequency component may be used as the component determining the structure of the projected index. A structure or grating supplied with a given spatial frequency component may be associated with the photoelectric detector as index carrier. Again, a double wedge may be used to control the distance between back-lens and image. Advantageously one of the wedges of the double wedge may be movably supported and so dimensioned in length that it will be traversed by the measuring beams and twice by the reference beam. Spatially fixed wedges are located opposite it in the region of the reference beam, while it operates in concert with a movably supported wedge in the region of the measuring beams. Means may be provided which control the motion of the long wedge of the double-wedge as a function of the output signals of the detector(s) of the reference beam, while the motion of the other wedge associated with the measuring beams is controlled as a function of the detector(s) associated with the measuring beams.

BRIEF DESCRIPTION OF THE DRAWINGS

Embodiments of the apparatus are shown schematically in the drawings and described below:

FIG. 1 is a plan view of the apparatus of the present invention with rhombic prisms for photoelectrically determining the position of an image focus plane;

FIG. 1a is another embodiment of FIG. 1 wherein the rhombic prisms are replaced by corresponding mirror systems;

FIG. 2 shows a variation of FIG. 1 with inserted mirror systems for the reference beam;

FIG. 2a is a side view of the apparatus of FIG. 2;

FIG. 3 shows a variation of FIG. 1 with assembled mirror systems for the reference beam;

FIG. 4 shows in side view a variation of FIG. 3 with wedges of a double-wedge controllable independent of each other;

FIG. 4a is a detailed showing from the side, of the wedge system of FIG. 4; and

FIG. 4b is a detailed top plan view of the grating of FIG. 4.

DESCRIPTION OF THE PREFERRED EMBODIMENTS

FIG. 1 shows an optical correlator used as range finder, in which a structure or grating 11 with a field lens 12 is mounted behind objective 10, the grating being moved perpendicularly to the optical axis and to the indices of the screen or grating by a drive 15. Photoelectric detectors 14 through 17 of an photoelectric receiver system are mounted behind structure or grating 11, sensing the light fluxes from the object after they interact with structure or grating 11 and converting them into corresponding electric signals. These signals are used, as disclosed in Application Ser. No. 479,525 to display the object distance and/or to automatically focus the range finder on suitable objects. As shown, two rhombic prisms 19, 20 that may be replaced by the mirror system 35 to 38 of FIG. 1a are mounted in front of the objective so that each time one pupil half of said objective receives light from one of the two rhombic prisms. The pre-mounted prisms therefore artificially enlarge the distance between the gravity centers of pupil with respect to the object, which is of favorable consequence for instrument accuracy.

It may be noted that the instrumentation described so far is less susceptible to interferences occuring from mechanical displacement of the optical components, for instance as due to thermal effects, than instrumentation comprising two objectives. Nevertheless, such interferences may occur and spuriously affect the measurement data. In order to recognize such effects or to eliminate them, the arrangement of FIG. 1 is supplemented by an arrangement as shown for instance in FIG. 2. As seen, a hexahedron 21 of transparent material is inserted between the two rhombi, which is provided with two plane mirror surfaces 21' as a mirror system. A light source 22 illuminates one index carrier 23, the index(es) of which are (is) imaged by objective 10 through the correspondingly designed as a mirror surface of rhombic prism 19 on the left hand mirror surface 21'. After being deflected at both mirror surfaces 21', the reference beam again traverses objective 10 and impinges on an index carrier, which in this instance is represented by measurement structure or grating 11. A photoelectric detector 24 is mounted behind the imaging site on this structure or grating, which senses the reference beam after its interaction with a structure or grating 11 and emits electrical signals corresponding to the relative position between the image of index carrier 23 and structure or grating 11. These signals may be used on one hand to display any interference in the assembly of the instrumantation and the errors so caused, both in magnitude and direction, or they may be used also directly to eliminate errors in the measurement data, either by servo controlled means of compensation in the beam or for instance by providing correction data to a computer 39 operating jointly with the instrumentation. Not shown are optical means for error compensation known per se, as for instance plano-parallel plates.

FIG. 3 shows an embodiment in which the reference beam generated by a light source 22 illuminating an index carrier 23 is made to pass through objective 10 into the components traversed by the measuring beam and opposite in direction to the incident object radiation thereby travelling the whole length of rhombic prism 19. A pentaprism 26 with complementary wedge is mounted on rhombic prism 19, deflecting the reference beam in the direction of rhombic prism 20. On prism 20 is also mounted a pentaprism 25 with complementary wedge, by means of which that reference beam is deflected in the direction of the incident object radiation which traverses both rhombic prism 20 and objective 10 together with the measuring beam and which here again impinges on structure or grating 11 of the measurement instrumentation. What was said above already corresponds to the photoelectric detectors 24 mounted afterward and to the analysis of their signals. For greater clarity, the plane in which are located both the light source and the photoelectric detectors have been folded into that of the drawing to allow description of detector arrangement with respect to the optical axis. Obviously the spatial arrangement of the components of the reference beam is so selected here and in the embodiment of FIG. 2 that the reference beam upon incidence on structure or grating 11 will not adversely affect the object images required for measurement. This may be achieved by a suitable arrangement of light source 22 and index carrier 23 with respect to the system's optical axis.

Variations in what so far has been described above are feasible. On one hand two detectors may be replaced by a single one if care is taken that the two pertinent beams impinge alternatingly on this single one, if suitable by using an intermediate dark pause. Also, the reference beam may be associated with its own sensing index carrier. Both index carriers of the reference beam may be designed as perforated or strip stops, or as structures or gratings. Again, the arrangement of one or both of index carriers associated with the reference beam is feasible otherwise than in the conjugate planes shown. Futher, an oscillating index carrier may be the component determining the structure of the projected index. In this latter case, the index carrier associated with the photoelectric detector preferably should be spatially fixed. Lastly, a multiply subdivided photoelectric receiver system may be used instead of at least one together with its associated index carrier, such as for instance are known as cell arrays.

It is known that there are two possibilities to change the spacing between an object and a predetermined image plane. On the one hand the spacing may be altered spatially, by shifting either objective or image plane. On the other hand, such an alteration in spacing also may be obtained by inserting a double-wedge after the objective, the optical thickness of this wedge being appropriately changed.

Thus means may be provided to act on the relative position of the double-wedge so that the signals obtained from the measuring beam are balanced. The relative associations of the two wedges of the double wedge then correspond to the measured distance or to part thereof when a minimum distance is predetermined by the orientation of objective and structure or grating.

If now the output signals of the reference beam are also to be included in such automation, one obtains an arrangement as is shown in side view in FIG. 4 with reference to FIG. 3. As is seen, a double-wedge system is mounted here in the space between objective 10 and structure or grating 11, consisting of one long wedge 30 on one hand, and three short mating wedges 31 through 33 on the other. Wedge 30 is so dimensioned as to be traversed by the reference beam at both outsides where the two spatially fixed wedges 31 and 33 are opposite to it. Wedge 32 opposite the center of wedge 30 is movably supported and may be controlled in its relative position to the optical axis by the signals from the measuring beam that are processed in a computer 39. Control signals derived from this process are fed to a servo-system which moves the wedge 32 in the direction of the double-headed arrow as indicated in wedge 31 of FIG. 1a. Wedge 30 too is movably supported with respect to the optical axis and is controlled by the signals from the reference beam that also are processed in the computer 39 for controlling via servo system wedge 30 as indicated by the double-headed arrow in wedge 30 of FIG. 4a. This allows compensating constructional changes due to thermal effects affecting the measurement results and hence to avoid the latter.

As indicated in dashed lines, a pivotably supported plate 34 parallel to the plane of the wedge system may be mounted between objective 10 and structure or grating 11, which is used to adjust the relative phase relation of the measurement signals, with respect to each other for a predetermined object.

We claim:

1. In an apparatus for determining the position of a focusing plane of an image within an optical device comprising: along an optical axis, an optical correlator incorporating imaging optics for imaging an object into an image plane, at least one structure or grating acting as spatial frequency filter and mounted in or in the vicinity of said image plane of said imaging optics;

further incorporating means for photoelectrically detecting associated with said spatial frequency filter;

means for defining the entrance pupil of said imaging optics into a plurality of different regions being traversed by light fluxes emitted from said object as a set of light fluxes to be measured and to be imaged on said spatial frequency filter for being jointly modulated;

means for splitting said set of light fluxes corresponding to the respective pupil regions into a pair of sets of partial light fluxes;

means for causing a relative movement between said structure or grating and said image of said object;

said means within said optical correlator for photoelectrically detecting further generating electrical output signals in response to respective ones of said partial light fluxes; and means for processing said signals to drive further electrical signals being indicative of the position of the focusing plane of the image;

the improvement comprising:

said means for defining the entrance pupil of said imaging system into a plurality of different regions comprising two rhombic prisms (19,20) in front of said optical imaging system, each of said prisms being laterally and symmetrically arranged with respect to said optical axis of said optical imaging system for enlarging the distance between the gravity centers of said entrance pupil of said optical imaging system.

2. The apparatus of claim 1, wherein a double wedge (30–33) is positioned between said imaging optics and said means for splitting.

3. The apparatus of claim 2, wherein a pivotably supported plate (34) is mounted between said imaging optics and said double wedge and parallel to said means for splitting.

4. The apparatus of claim 1, further comprising means for generating a reference beam indicating mechanically acting changes affecting at least one of the measuring beams passing through halves of said entrance pupil associated with at least one of said means for photoelectrically detecting (24) of which the output signals corresponding to the changes are used for display and/or correction of the changes or the effects from same.

5. The apparatus of claim 4, wherein said means for generating said reference beam comprises an illuminating device (22) emitting said reference beam thus illuminating an index carrier provided with at least one index (23) which is imaged by objective (10) and the reference beam so generated is introduced into the measuring beam of one pupil half in a direction opposite to the incidence of the object radiation, and optical means (21,25,26) for transferring the reference beam into the beam of the other pupil half and in direction of incidence of the object radiation is provided, said index carrier impinged by said reference beam being associated with at least one of said means for photoelectrically detecting (24) for the generation of signals corresponding to the offset between a nominal position and the projected index image.

6. The apparatus of claim 5, wherein two mirror systems (25,26) mounted on said rhombic prisms (19,20) are provided as the optical means for transferring the reference beam.

7. The apparatus of claim 6, wherein said mirror systems mounted on said shombic prisms (19,20) are pentaprisms (25,26).

8. The apparatus of claim 5, wherein a mirror system (21,21') inserted between said rhombic prisms (19,20) is provided as the optical means for transferring the reference beam.

9. The apparatus of claim 5 wherein a structure or grating defining a given spatial frequency component is provided as the component determining the structure of the projected index.

10. The apparatus of claim 5, wherein an index carrier in the form of a structure or grating (11) defining a given spatial frequency component is associated with said means for photoelectrically detecting (24).

11. The apparatus of claim 10, wherein one wedge (30) of a double wedge is movably supported and has a given length that is traversed by the measuring beams and twice by the reference beam, said wedge faced in the areas of the reference beam by spatially fixed wedges (31,33), while operating jointly with a movably supported wedge (32) in the region of the measuring beams.

12. The apparatus of claim 11 wherein means are provided for controlling the motion of said one wedge (30) of the double wedge as a function of the output signals from said detector (24) of the reference beam and for controlling the motion of said supported wedge (32) as a function of the output signals from additional detectors (14 through 17) associated with the measuring beams.

13. In an apparatus for determining the position of a focusing plane of an image within an optical device comprising:

along an optical axis, an optical correlator incorporating imaging optics for imaging an object into an image plane, at least one structure or grating acting as spatial frequency filter and mounted in or in the vicinity of said image plane of said imaging optics, further incorporating means for photoelectrically detecting associated with said spatial frequency filter;

means for defining the entrance pupil of said imaging optics into a plurality of different regions being traversed by light fluxes emitted from said object as a set of light fluxes to be measured and to be imaged on said spatial frequency filter for being jointly modulated;

means for splitting said set of light fluxes corresponding to the respective pupil regions into a pair of sets of partial light fluxes;

means for causing a relative movement between said structure or grating of said image of said object;

said means within said optical correlator for photoelectrically detecting further generating electrical output signals in response to respective ones of said partial light fluxes; and means for processing said signals to derive further electrical signals being indicative of the position of the focussing plane of the image, the improvement comprising:

said means for defining the entrance pupil of said imaging system into a plurality of different regions comprising mirror systems (35,36,37,38) in front of said optical imaging system, each of said mirror systems being laterally and symmetrically arranged with respect to said optical axis of said optical imaging system for enlarging the distance between gravity centers of said entrance pupil of said optical imaging system.

14. The apparatus of claim 13, wherein a double wedge (30-33) is positioned between said imaging optics and said means for splitting.

15. The apparatus of claim 14, wherein a pivotably supported plate (34) is mounted between said imaging optics and said double wedge and parallel to said means for splitting.

16. The apparatus of claim 13, further comprising means for generating a reference beam indicating mechanically acting changes affecting at least one of the measuring beams passing through halves of said entrance pupil, associated with at least one of said means for photoelectrically detecting (24) of which the output signals corresponding to the changes are used for display and/or connection of the changes or of the effects of same.

17. The apparatus of claim 16, wherein said means for generating said reference beam comprises an illuminating device (22) emitting said reference beam thus illuminating an index carrier provided with at least one index which is imaged by objective (10), and the reference beam so generated is introduced into the measuring beam of one pupil half in a direction opposite to the incidence of the object radiation, and optical means (21,25,26) for transferring the reference beam into the beam of the other pupil half and in a direction of incidence of the object radiation is provided, said index carrier impinged by said reference beam being associated with at least one of said means for photoelectrically detecting (24) for the generation of signals corresponding to the offset between a nominal position and the projected index image.

18. The apparatus of claim 17, wherein a structure of grating defining a given spatial frequency component is provided as the component determining the structure of the projected index.

19. The apparatus of claim 17, wherein an index carrier in the form of a structure or grating (11) defining a given spatial frequency component is associated with said means for photoelectrically detecting (24).

20. The apparatus of claim 19, wherein one wedge (30) of a double wedge is movably supported and has a given length that is traversed by the measuring beam and twice by the reference beam, said wedge is faced in the areas of the reference beam by spatially fixed wedges (31,33) while operating jointly with a movably supported wedge (32) in the region of the measuring beams.

21. The apparatus of claim 20, wherein means are provided for controlling the motion of said one wedge (30) of the double wedge as a function of the output signals from said detector (24) of the reference beam and for controlling the motion of said supported wedge (32) as a function of the output signals from additional detectors (14 through 17) associated with the measuring beams.

* * * * *